Figure 1:
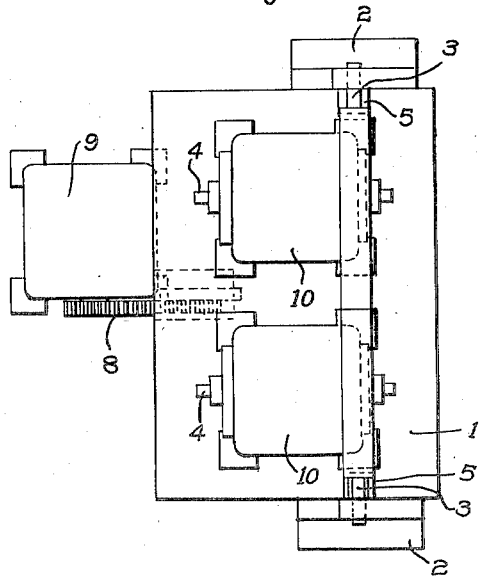

Oct. 15, 1929.           G. M. EATON           1,731,922

DYNAMIC BALANCING DEVICE

Filed April 2, 1924

WITNESSES:
A. G. Schiefelbein.
W. B. Jaspert.

INVENTOR
George M. Eaton.
BY
Wesley G. Carr
ATTORNEY

Patented Oct. 15, 1929

1,731,922

UNITED STATES PATENT OFFICE

GEORGE M. EATON, OF WILKINSBURG, PENNSYLVANIA, ASSIGNOR TO WESTINGHOUSE ELECTRIC & MANUFACTURING COMPANY, A CORPORATION OF PENNSYLVANIA

DYNAMIC BALANCING DEVICE

Application filed April 2, 1924. Serial No. 703,822.

My invention relates to balancing machines and a method of balancing rotors, such as armatures of dynamo-electric machines, in an efficient and expedient manner.

It is among the objects of my invention to provide a method of testing and correcting the unbalanced mass in rotors in a simple and efficient manner.

It is a further object of my invention to provide a simple and inexpensive device for testing armatures of dynamo-electric machines, either individually or simultaneously and which shall be adapted to the testing of the dynamic and static unbalance of such machines in manufacturing quantities.

In the manufacture of small motors, the balance of the armature mass is an essential feature and it is necessary to reduce the unbalanced mass to a minimum because of the high speed of rotation of the armature. Various types of balancing machines have been proposed to make corrections for the unbalanced masses of small rotors on a commercial basis.

In the usual type of balancing machine, the unbalance is indicated by the oscillations of the structure upon which the rotor is mounted and rotated. Thus the function of such prior devices was dependent upon a prime motion of rotation producing a resultant motion of oscillation.

My present invention is dependent upon a prime motion of oscillation producing a resultant motion of rotation. The motor is actuated by subjecting it to such forces as will produce spontaneous rotation. Such rotation is effected by the position and inertia of the unbalanced or parasite mass, which produces rotation in small increments until the mass locates itself in a plane that is vertical to the base upon which the rotor is mounted. In practicing my invention, I utilize a simple device which eliminates the intricate mechanism heretofore employed and which requires no particular skill by the operator to produce satisfactory results.

I propose to utilize an oscillatable bed or other suitable support which is adapted to receive intermittent impulse motions that are transmitted to the rotors which are journalled for rotation on the bed member. The impulses or impacts produce angular movement of the rotor in small increments, until the unbalanced mass becomes located in a substantially vertical plane with the heavy mass at the bottom of the rotor where it is conveniently accessible for the removal of excess material.

In the accompanying drawing constituting a part hereof and in which like reference characters designate like parts:

Fig. 1 is a plan view of a balancing device for balancing small motors, which are permanently mounted in their housings or frames, embodying the principle of my invention.

Figure 3:
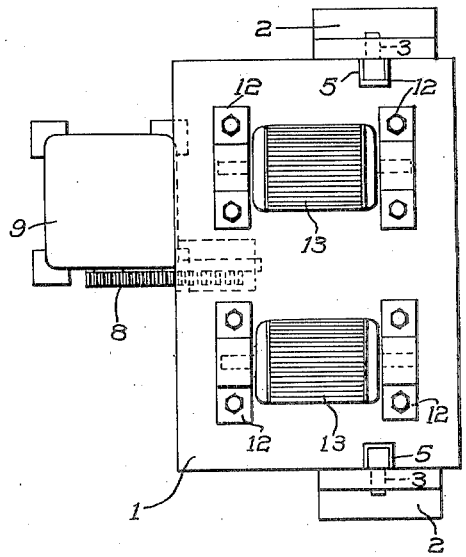
Figure 2:
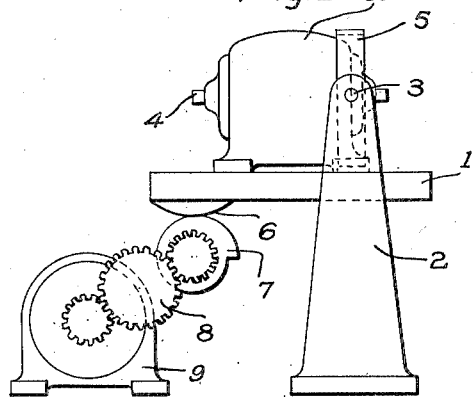
Figure 4:
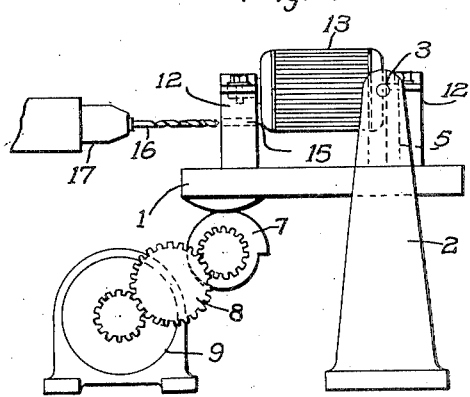
Figure 5:
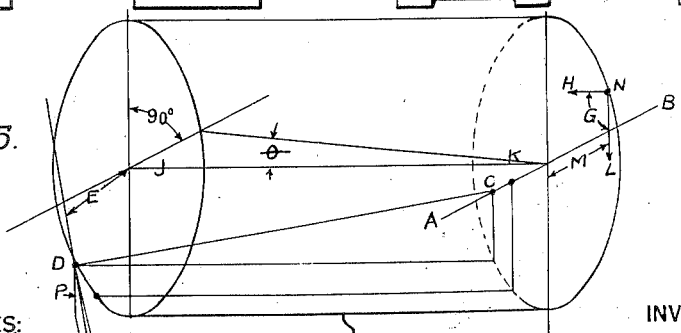

Fig. 2 is a side elevational view thereof illustrating the actuating mechanism for oscillating the table or bed member, Fig. 3 is a plan view of a similar device adapted for the testing of rotors, such as the armatures of dynamo-electric machines, Fig. 4 is a side elevational view thereof, illustrating a drilling device which is adapted to remove the excess mass when properly located, and Fig. 5 is a schematic view of a rotor showing the unbalanced masses and the planes of correction relative to the axis of rotation.

Referring to Figs. 1 and 2, the device therein illustrated comprises a bed member 1 which is pivotally mounted on a pair of vertical pedestals 2 by means of a pair of trunnion members 3 that are located in the horizontal axis of a rotor or motor shaft 4. Trunnions 3 are adapted to engage bearing blocks 5 which are secured to the bed 1 in any suitable manner. The under side of the bed 1 is provided with a bumper block 6 that is adapted to engage a cam member 7 rotatably mounted in proximity to the bed member 1 and a gear train 8 is provided to connect the cam member 7 with a driving motor 9.

A plurality of motors 10 are mounted on the bed plate 1 in such manner that their respective armatures have an end face in the center line of the trunnion members 3, these end faces being the transverse planes in which correction for the unbalanced mass of the rotor is usually made by the addition or removal of material.

In Fig. 3, the bed 1 is provided with a plurality of bearing blocks 12 that serve as journals for rotating the shafts of armatures 13. The bed 1 is pivotally mounted on the pedestal blocks 2 in a manner similar to that of Figs. 1 and 2 with the trunnion members 3 in the center line of the axes of the armature shafts. The bearing blocks 12 are so located that the end faces of the armature 13 are in the vertical center line of the trunnions 3 so that the oscillatory movement of the bed 1 will be about the intersection of the longitudinal and vertical planes of the rotors at the end faces thereof.

One of the bearing blocks 12 is provided with an opening 15 which is in working alinement with a drill member 16 that is secured in a drill chuck or holder 17 associated with suitable actuating mechanism. The drill is adapted to be entered in the opening 15 to extend through the block 12 to operate on the lower side of the armature 13 for the purpose of removing material therefrom.

The operation of this device is briefly as follows, and may be described in connection with the diagrammatic view shown in Fig. 5.

The cylinder 19 represents a rotor mounted as shown in Figs. 1, 2, 3 and 4, so that it may rotate freely about the axis J K. Rotation however is practically limited in response to small couples applied for a short time by the friction of the bearings and the inertia of the cylinder.

The mounting of the cylinder also permits rotation about the axis A B corresponding to the pivotal axis 3, lying in the same radial plane as N. The cylinder is oscillated about A B through the angle θ, the lower limit of the oscillation being the horizontal position of the axis J K.

The character of the oscillation is a slow elevation produced by the cam 7 or in any other suitable manner involving accelerations which produce inertia couples in connection with the parasite masses. The couples are so small that they are well within the limits of resistance to rotation about J K. When the maximum elevation is reached a downward acceleration is produced which is as close as possible to the limit of resistance to rotation about J K. A uniform rate of acceleration is maintained to build up the greatest possible velocity and consequent kinetic energy in parasite mass D.

At the bottom limit of the oscillation, there is approximated as closely as possible a dead impact that completes the oscillation cycle which is repeated as many times as is necessary to produce the desired result.

At the instant of impact, D is acted upon by a gravity force P and a tangential force Q, which may be resolved as a single force F. This force F exerts a couple F E tending to revolve the cylinder about the axis J K. The amplitude θ and the velocity at impact are so proportioned that a parasite mass of objectionable size will overcome the resistance to rotation about J K. When rotation of the cylinder ceases the mass D is at or near the lower portion of the vertical center line and some material is removed by the drill 16, after which the operation is repeated until the mass D is eliminated. The cylinder is then reversed end to end to bring the corrected plane in axial alinement with the trunnions 3 and correction of the parasite masses in the opposite end plane is made in the manner described above.

It will be noted that a plurality of rotors 13 or motors 10 may be corrected at one time although the motors 10 cannot be corrected while mounted on the bed member 1, since the drill cannot be conveniently applied to the armature while it is journalled in the housing, but in this instance the rotor may be corrected by the addition of weights which may be plugged into the ends of the armature through openings in the end frames of the motors or in any other suitable manner.

It is evident from the above description of my invention that a balancing mechanism such as is described therein provides a simple and efficient means for testing the unbalance of rotors and correcting the same without removing them from the testing device. Another advantage is that my process is adapted to the testing of a plurality of such rotors simultaneously.

Although I have described a specific embodiment of my invention, it will be obvious to those skilled in the art that various modifications may be made in the details of construction such as in the design and proportion of the several co-operating parts without departing from the principles herein set forth.

I claim as my invention:

1. A balancing machine comprising an oscillatable bed hinged at one end and means for imparting impulses to the other end thereof, said means comprising a cam actuated bumper block.

2. A balancing machine comprising an oscillatable bed hinged at one end, a cam mounted in co-operative alinement with the other end thereof, and actuating means for effecting intermittent engagement of said cam and bed.

3. A balancing machine comprising an oscillatable bed hinged at one end, a cam mounted in co-operative alinement near the other end thereof, and rotative means for effecting intermittent engagement of said cam and bed.

4. The method of balancing rotors which comprises journalling a rotor in a base pivoted for angular movement in such manner that the base is free to move angularly about an axis in one transverse plane of the rotor, subjecting the base to impact to cause the rotor to rotate until the heavy side comes to rest at a predetermined position and making corrections for the unbalanced mass in another transverse plane of the rotor.

5. The method of balancing rotors which comprises journalling a rotor in a base pivoted for angular movement, subjecting the base to impacts to cause it to oscillate about an axis in a transverse plane of the rotor until the heavy side of the rotor is at the bottom of a vertical plane taken along the axis of the rotor, and removing or adding weight in another transverse plane of the rotor.

6. The method of balancing motors which comprises providing a vibratory bed pivoted for angular movement, mounting a plurality of motors thereon, and actuating said bed to impart intermittent movement thereto to effect angular movement of the rotors about their axis of symmetry in small increments, until the unbalanced mass is located in a substantially vertical plane running through the rotor axis.

7. The method of balancing motors which comprises providing an oscillatory bed pivoted for angular movement, mounting a plurality of motors thereon, subjecting said bed to impact to effect angular movement of the rotors in small increments until the unbalanced mass is located in a substantially vertical plane, running through the rotor axis and correcting the unbalanced mass of said rotors by removing or adding material in a given transverse plane.

8. The method of balancing rotors which comprises mounting the rotor on an oscillatable bed to adapt it to pivot about a transverse axis at the longitudinal center line of the rotor shaft in one of two transverse planes in which correction for the unbalanced mass is to be made, submitting said rotor to impact to rotate the same and correcting the unbalanced mass in the plane of correction farthest from the pivotal axis about which said rotor oscillates.

9. The method of balancing rotors which comprises mounting the rotor on an oscillatable bed to adapt it to pivot about a transverse axis at the longitudinal center line of the rotor shaft in one of two transverse planes in which correction for the unbalanced mass is to be made, causing spontaneous rotation of said rotor and automatically eliminating rotation thereof when its unbalanced mass lies in a substantially vertical plane running through the axis of the rotor.

10. The method of balancing rotors which comprises mounting the rotor on an oscillatable bed to adapt it to pivot about a transverse axis at the longitudinal center line of the rotor shaft in one of two transverse planes in which correction for the unbalanced mass is to be made, causing spontaneous rotation of said rotor until its unbalanced mass lies in a substantially vertical plane running through the axis of the rotor and correcting the unbalanced mass in the intersection of the other of said transverse planes and said vertical plane.

11. The method of balancing rotors which comprises mounting the rotors on an oscillatable bed pivoted for angular movement and subjecting the bed to movements of such character that dynamic forces are set up in one portion of the rotor which cause it to rotate and thereby indicate the position of unbalanced mass in that portion.

12. The method of balancing rotors which comprises mounting the rotors on an oscillatable bed pivoted for angular movement and subjecting the bed to movements of such character that dynamic forces are set up in one portion of the rotor which cause it to rotate and thereby indicate the position of unbalanced mass in that portion, the character of said actuations being independent of the degree of unbalance.

13. The method of balancing rotors that comprises journalling a rotor in such manner that it is adapted to pivot about an axis at right angles to its axis of rotation and in a transverse plane of the rotor, subjecting the rotor to movements that set up dynamic forces having a maximum component in one direction to turn the rotor about its axis until the unbalanced mass therein is brought to a predetermined position, and making correction for the unbalanced mass in another transverse plane of the rotor.

14. The method of balancing rotors that comprises mounting a rotor in such manner that it is free to turn about its normal axis of rotation and adapted to be oscillated about an axis at right angles to its axis of rotation and in a transverse plane of the rotor; causing the rotor to oscillate about its axis of oscillation in such manner that the dynamic forces exerted by the rotor are greater in one direction of oscillation than in the other to thereby cause the unbalanced masses outside of the said transverse plane of the rotor to turn it until said unbalanced masses are in a predetermined position, and correcting for the unbalanced masses by changing the mass distribution of the rotor in another transverse plane thereof.

15. The method of balancing rotors that comprises mounting a rotor in such manner that it is free to turn about its normal axis of rotation and to oscillate about an axis at right angles to its axis of rotation, oscillating the rotor in such manner that dynamic forces are set up within the unbalanced mass in the rotor thereby turning said mass to a predetermined position, and correcting for the unbalanced mass by changing the mass distribution of the rotor.

In testimony whereof, I have hereunto subscribed my name this 17th day of March, 1924.

GEORGE M. EATON.